United States Patent [19]

Metts

[11] Patent Number: 5,018,662

[45] Date of Patent: May 28, 1991

[54] COATING AND BRAZING TECHNIQUE

[75] Inventor: Glenn A. Metts, Maumee, Ohio

[73] Assignee: P & J Industries, Inc., Toledo, Ohio

[21] Appl. No.: 485,046

[22] Filed: Feb. 26, 1990

[51] Int. Cl.$^5$ .............................................. B23K 1/20
[52] U.S. Cl. ................................. 228/208; 228/263.18
[58] Field of Search ........... 228/208, 209, 214, 263.14, 228/263.15, 263.16, 263.18

[56] References Cited

U.S. PATENT DOCUMENTS

| | | | |
|---|---|---|---|
| 1,651,709 | 12/1927 | Jones .................................... | 228/263 |
| 3,069,765 | 12/1962 | Simpelaar ............................ | 228/198 |
| 3,164,897 | 1/1965 | Patriarca .............................. | 228/209 |
| 4,078,713 | 3/1978 | Marshall .......................... | 228/263.14 |
| 4,223,826 | 9/1980 | Usui ...................................... | 228/208 |
| 4,673,468 | 6/1987 | Myers .................................... | 204/24 |

FOREIGN PATENT DOCUMENTS

| | | | |
|---|---|---|---|
| 0120475 | 9/1980 | Japan .................................... | 228/209 |
| 0863369 | 3/1961 | United Kingdom ........... | 228/263.15 |

*Primary Examiner*—Richard K. Seidel
*Attorney, Agent, or Firm*—Marshall & Melhorn

[57] ABSTRACT

A coating and brazing technique for the manufacture of an assembly of metallic components for use in the fuel system of an internal combustion engine. A layer of corrosion resistant material is deposited on the interior of the various metallic components. The components are brazed together using a brazing compound having satisfactory corrosion resistance, and which has a melting temperature below that of the coating material. The interior of the assembly is thereby provided with a completely continuous layer of corrosion resistant material.

5 Claims, No Drawings

COATING AND BRAZING TECHNIQUE

FIELD OF THE INVENTION

This invention pertains generally to a technique for coating and brazing the metallic components of an assembly requiring corrosion resistance, and more particularly to a coating and brazing technique for the manufacture of an assembly of metallic components for use in the fuel system of an internal combustion engine.

BACKGROUND OF THE INVENTION

Assemblies composed of metallic components are commonly employed in applications requiring corrosion resistance. One such application is in the fuel system of an internal combustion engine, which requires a degree of resistance to various fuels on the inside of the rail body and various other parts of the system which are generally brazed together. Steel tubing and other steel components used in the fuel system, such as fuel rail bodies, cause the oxidation of the gasoline passing through the system unless these components are provided with a corrosion resistent coating on the interior thereof. The oxidation of the gasoline results in the formation of what is known as "sour gasoline".

Furthermore, there has been increased experimentation with alternative fuels, such as methanol. These fuels may cause corrosion of the fuel rail body itself unless the interior of the system is provided with an adequate corrosion resistent coating.

It is well known that nickel and nickel alloys are well adapted for use where corrosion resistance is required. Likewise, methods of applying nickel alloy coatings are well known. One method of commercial nickel phosphorus electroplating is described in U.S. Pat. No. 4,673,468 to Myers et al. An electroless method of applying a nickel alloy coating is described in U.S. Pat. No. 3,069,765 to Simpelaar.

Numerous methods of applying a corrosion resistant coating to the interior of the fuel system assemblies of an internal combustion engine have been attempted. The coatings have heretofore generally been applied after the various components have been joined together using conventional brazing techniques. Thus, the metallic components are bonded together by conventional brazing methods, and then a corrosion resistant coating is deposited on the interior of the assembly. This process, however, has not been completely successful, especially with respect to the coating of the interior of the rail bodies of a fuel system. Disadvantageously, when the coating is deposited after assembly of the components, the layer of corrosion resistent material which results is not completely continuous over the interior of the assembly, allowing oxidation of the fuel at the uncoated sites.

SUMMARY OF THE INVENTION

In accordance with the present invention, there is provided a method of coating and brazing the various metallic components of an assembly. Employing conventional electrolytic or electroless plating techniques, a layer of a corrosion resistant material, such as a nickel alloy or copper, as examples, is deposited on the interior of the various metallic components of an assembly. The thickness of this layer must be such that the coating provides adequate corrosion protection for the environmental conditions of the specific application.

Once a sufficiently thick layer of corrosion resistant material has been deposited on the interior of each of the individual metallic components, the components are arranged in the desired configuration and brazed together at their various junctures using conventional flow brazing technology. The brazing compound is comprised of a material which will display satisfactory corrosion resistance, and may be comparable to that of the coating itself, and which has a melting temperature below that of the coating material. The interior of the assembly is thereby provided with a completely continuous layer of corrosion resistant material.

It is an object of the invention to provide an improved method for providing corrosion resistance to the interior of an assembly of metallic components joined by brazing;

Another object of the invention is to provide a method, which includes the application of a corrosion resistant coating to the interior of the assembly, wherein the interior is free from uncoated sites;

Other objects and advantages will become more apparent during the course of the following description.

DESCRIPTION OF THE PREFERRED EMBODIMENTS

Assemblies of metallic components for use in the fuel system of an internal combustion engine must have a degree of corrosion resistance to the fuel passing therethrough. In accordance with the present invention, there is provided a method for coating and brazing such an assembly so that a continuous layer of corrosion resistant material is provided over the interior of the assembly.

The components of an assembly for the fuel system of an internal combustion engine are generally composed of low carbon or stainless steel. Conventional plating techniques are employed to deposit a layer of corrosion resistant material on the interior of all of the individual metallic components of the assembly. The deposit of this layer may be accomplished by electroless or electrolytic plating techniques, or any other suitable coating process, with any corrosion resistant material, such as copper or a nickel alloy. This layer must be of sufficient thickness to provide adequate corrosion resistance for the environmental conditions of the specific application.

By applying the coating prior to assembly of the components, it is much simpler to ensure that a completely continuous layer of the material has been deposited on the interior of each of the individual components. This eliminates the possibility of uncoated sites which often result and will likely go undetected if the coating is applied after the components are assembled. Oxidation of the fuel will occur at any uncoated site on the interior of the assembly.

After the corrosion resistent coating has been applied to all of the individual components, the components are arranged in the desired configuration. The components are brazed together at their various junctures using conventional flow brazing technology. The brazing compound is comprised of a material which will provide corrosion resistance comparable to that of the coating, such as copper or a nickel alloy. The brazing compound must have a lower melting temperature than the coating material so that the coating will not melt during the brazing process. If the coating melts during brazing, uncoated sites will develop in the interior of the assembly, allowing oxidation of the fuel.

In a preferred embodiment, the coating material is comprised of a low phosphorus content nickel alloy, containing approximately 97 percent nickel and 3 percent phosphorus, while the brazing compound is comprised of a nickel alloy containing approximately 88.5 percent nickel, 10.6 percent phosphorus, and less than 1 percent other. The comparatively higher phosphorus content of the brazing compound produces a comparatively lower melting temperature to that of the coating material. The difference between the melting temperature of the coating material and the melting temperature of the brazing compound must provide a sufficient brazing window within which efficient brazing will occur without melting the coating material. An adequate brazing window results with a phosphorus content in the coating material of between 3 to 7 percent, and a phosphorus content in the brazing compound of between 10 to 12 percent. The selection of the particular coating material and brazing compound to be used depends on the specific application and the brazing window desired.

It is to be understood that the form of the invention described is an illustrative embodiment only of the same, and that various procedural changes may be resorted to without departing from the spirit of the invention.

What is claimed is:

1. In a method of manufacturing an assembly of metallic a components for use in the fuel system of an internal combustion engine, the steps comprising:
    (a) applying a coating comprising a nickel alloy having a phosphorus content to the interior portions of the components of the assembly;
    (b) placing the components in the desired configuration;
    (c) applying a brazing compound comprising a nickel alloy having a phosphorus content comparatively higher than that of the nickel alloy of the coating and having a lower melting point of that of coating to the junctures of the components; and
    (d) applying heat to the junctures of the components sufficient to melt the brazing compound without melting the coating, and therefore to effectively join the components together to form said assembly.

2. A method as defined in claim 1, wherein the coating is applied by electroless deposit of the coating.

3. A method as defined in claim 1, wherein the coating is applied by electrolytic deposit of the coating.

4. A method as defined in claim 1, wherein the nickel alloy comprising the brazing compound contains between about 10 and 12 percent phosphorus.

5. A method as defined in claim 4, wherein the nickel alloy comprising the brazing compound contains approximately 10.6 percent phosphorus.

* * * * *